United States Patent [19]

Allison et al.

[11] Patent Number: 5,287,523
[45] Date of Patent: Feb. 15, 1994

[54] METHOD FOR SERVICING A PERIPHERAL INTERRUPT REQUEST IN A MICROCONTROLLER

[75] Inventors: Nigel J. Allison; Janice L. Benzel, both of Austin, Tex.; Joseph F. Kowalski, Warren, Mich.

[73] Assignees: Motorola, Inc., Schaumburg, Ill.; Ford Motor Company, Dearborn, Mich.

[21] Appl. No.: 597,464

[22] Filed: Oct. 9, 1990

[51] Int. Cl.[5] .............................................. G06F 9/20
[52] U.S. Cl. .................... 395/725; 364/DIG. 1; 364/230; 364/230.2; 364/231.5; 364/231.8; 364/241.2; 364/213.3; 364/243.5; 364/247; 364/247.5; 364/247.6; 364/247.7
[58] Field of Search ............... 364/DIG. 1, DIG. 2; 395/725, 650, 775, 550, 275, 375

[56] References Cited

U.S. PATENT DOCUMENTS

| | | | |
|---|---|---|---|
| 3,771,146 | 11/1973 | Cotton et al. | 395/725 |
| 3,789,365 | 6/1974 | Jen et al. | 395/275 |
| 4,037,204 | 7/1977 | Bennett et al. | 395/725 |
| 4,037,207 | 7/1977 | Birney et al. | 395/725 |
| 4,263,650 | 4/1981 | Bennett et al. | 395/275 |
| 4,271,468 | 6/1981 | Christensen | 395/275 |
| 4,400,769 | 8/1983 | Kaneda et al. | 395/650 |
| 4,573,118 | 2/1986 | Damouny et al. | 395/775 |
| 4,812,967 | 3/1989 | Hirozawa et al. | 395/725 |
| 4,816,992 | 3/1989 | Matsumoto | 395/725 |
| 4,860,190 | 8/1989 | Kaneda et al. | 395/275 |
| 4,908,750 | 3/1990 | Jablow | 395/650 |
| 4,926,322 | 5/1990 | Stimac et al. | 395/500 |
| 5,038,275 | 8/1991 | Dujari | 395/275 |
| 5,072,365 | 12/1991 | Burgess et al. | 395/725 |

*Primary Examiner*—Michael R. Fleming
*Assistant Examiner*—Ayaz R. Sheikh
*Attorney, Agent, or Firm*—Charlotte B. Whitaker

[57] ABSTRACT

A method for servicing peripheral interrupt requests in a data processing system is provided. A state vector register stores a current state of a state machine which controls the interrupt-generating peripheral. In addition, the state vector register simultaneously stores an interrupt source identifier, which indicates the source of the highest priority interrupt request currently pending for the interrupt-generating peripheral. When the processor receives an interrupt request, the value stored in the state vector register of the interrupt-generating peripheral is read into an index register in the processor. The processor then uses the value as an index into a jump table, stored in memory, which contains the interrupt service routines. The use of the state vector register in conjunction with existing internal signals enables the processor to rapidly retrieve the appropriate interrupt service routine from memory, while minimizing the system overhead associated with servicing the interrupt request.

8 Claims, 4 Drawing Sheets

METHOD FOR SERVICING A PERIPHERAL INTERRUPT REQUEST IN A MICROCONTROLLER

FIELD OF THE INVENTION

This invention relates generally to data processors, and more particularly, to a method for servicing interrupts in data processors.

BACKGROUND OF THE INVENTION

Today's microcontroller (MCU) employs vertical integration design techniques to provide highly sophisticated, on-chip peripheral capabilities (e.g. timer, serial communications interface). Typically, a central processing unit (CPU) in the microcontroller sequentially executes a set of instructions in response to requests (interrupts) from these on-chip peripheral devices. Some of these on-chip peripherals are real-time devices, which run asynchronously to the execution of the main program. Thus, the CPU can not predict exactly when these real-time peripherals will require servicing. It is necessary, therefore, to employ an interrupt system to allow the CPU to temporarily suspend normal program execution, and service the incoming requests from the on-chip peripheral. Generally, the interrupt system incorporates several prioritized interrupt levels which govern the order in which the CPU responds to the interrupt request. In response to a higher priority interrupt request, the CPU branches to an interrupt service routine, and commences execution of the sequence of instructions which comprise the service routine. Upon completion of the interrupt service routine, the CPU resumes normal program execution.

Generally, in low and mid-range microcontrollers, which do not support interrupt vector numbers, the CPU time required to service interrupts generated by on-chip peripherals creates a performance problem. The addition of on-chip peripheral capabilities may increase the overall performance of the MCU; however, for some MCUs these peripherals may incur too much processor (CPU) overhead to service interrupts. In known systems, the CPU typically performs three actions upon the occurrence of an interrupt. Initially, the CPU determines the specific cause of the interrupt. Secondly, the CPU determines what action to take, and thirdly the CPU performs the required action, which is usually a jump to the interrupt service routine. Generally, these three actions are time consuming, and must be performed for each interrupt.

In existing systems, such as the Motorola MC68HC11 MCU, the interrupt service routines are called through automatic hardware interrupt mechanisms. In response to an interrupt, the CPU suspends normal program execution, after finishing the currently executing instruction. Interrupt logic circuitry then pushes the contents of all of the CPU registers onto a stack, thereby insuring that the CPU context can be restored after the CPU finishes the interrupt service routine. After stacking the CPU registers, the vector for the highest priority pending interrupt source is loaded into the program counter (PC), and the CPU commences to execute the first instruction of the interrupt service routine. Essentially, the CPU must evaluate all pending interrupts to determine which source has the highest priority, after the contents of the CPU registers are pushed onto the stack.

Shown in FIG. 1 is a flow diagram 10 illustrating a known technique for processing interrupts. Typically, the CPU fetches and decodes instructions in accordance with a program sequence. Upon completion of the instructions execution, the CPU checks to see if an interrupt request occurred. Generally, each of the on-chip interrupt sources (e.g. peripherals) has a flag bit which indicates service is required, and an enable bit which enables the flag to generate hardware interrupt requests. The CPU reads the flag bits in priority order, thereby ascertaining the source of the interrupt, and retrieves the current state information (for the interrupt-generating peripheral) from a random access memory (RAM) device. Using the current state information, the CPU calculates the address for the corresponding interrupt service routine, and branches to the service routine. The current state of the interrupt-generating peripheral is saved in a location in RAM, and subsequently updated, by the CPU, with the next state information. The CPU proceeds to execute the interrupt service routine. Typically, the interrupt service routine terminates with a return from interrupt (RTI) instruction, which allows all CPU registers, and the return address, to be recovered from the stack. The CPU resumes execution of the interrupted program, as if no interrupt had occurred.

In many cases, the programmer uses a software state machine to redundantly mirror the action taken by the hardware state machine of the interrupt-generating peripheral. Duplication of the peripheral state machine in software wastes RAM space, and processor time. Consequently, the servicing of interrupts causes a significant burden on the overall system performance. Thus, it is desirable to provide an interrupt mechanism capable of overcoming the foregoing problems.

SUMMARY OF THE INVENTION

In a data processing system having a processor, a memory, and at least a selected number of peripheral devices coupled to the processor, via an internal communications bus, a method for servicing an interrupt request from one of the selected number of peripheral devices is provided. An index value is stored in an addressable register, in response to receiving the interrupt request. The index value comprises at least both a current state identifier, for identifying a state of a state machine which controls an interrupting peripheral device, and an incremental byte boundary identifier. The incremental byte boundary identifier is determined by alignment in the memory of a predetermined number of bytes of each of a plurality of interrupt service routines. The index value is provided to the processor. The processor uses the index value to access a corresponding interrupt service routine, stored in the memory, to respond to the interrupt request. The current state identifier stored in the addressable register is updated with a next state identifier, in response to the state machine changing states. The next state identifier and the incremental byte boundary identifier form a new index value in the addressable register.

DETAILED DESCRIPTION OF A PREFERRED EMBODIMENT

The terms "set" and "clear", and various grammatical forms thereof, are used herein to avoid confusion when dealing with a mixture of "active high", and "active low" logic signals. "Set" is used to refer to the rendering of a logic signal or register bit into its active, or logically true state. "Clear" is used to refer to the rendering of a logic signal or register bit into its inactive, or logically false state.

Figure 1:
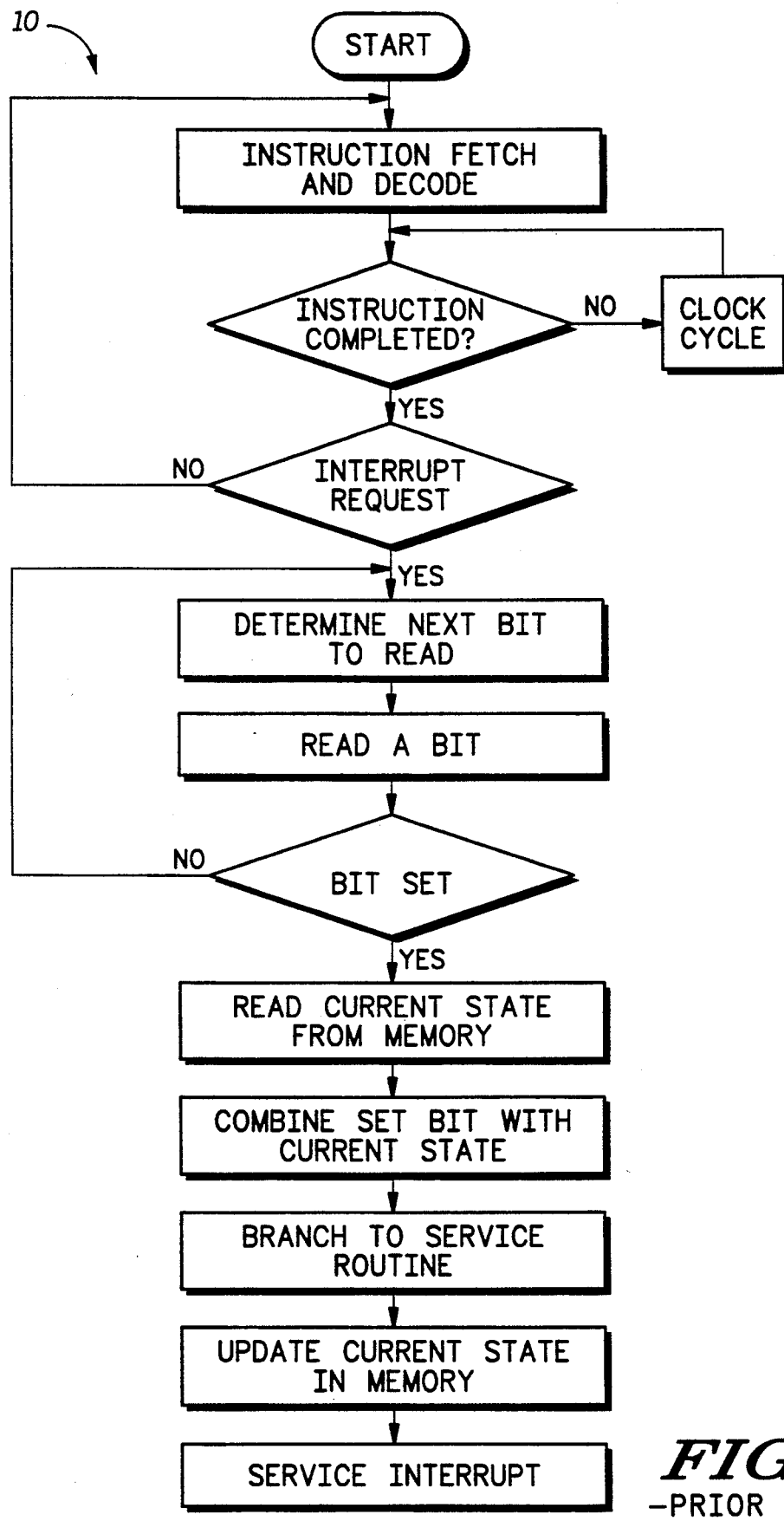
FIG. 1 is a known functional flow diagram for processing interrupts.
Figure 2:
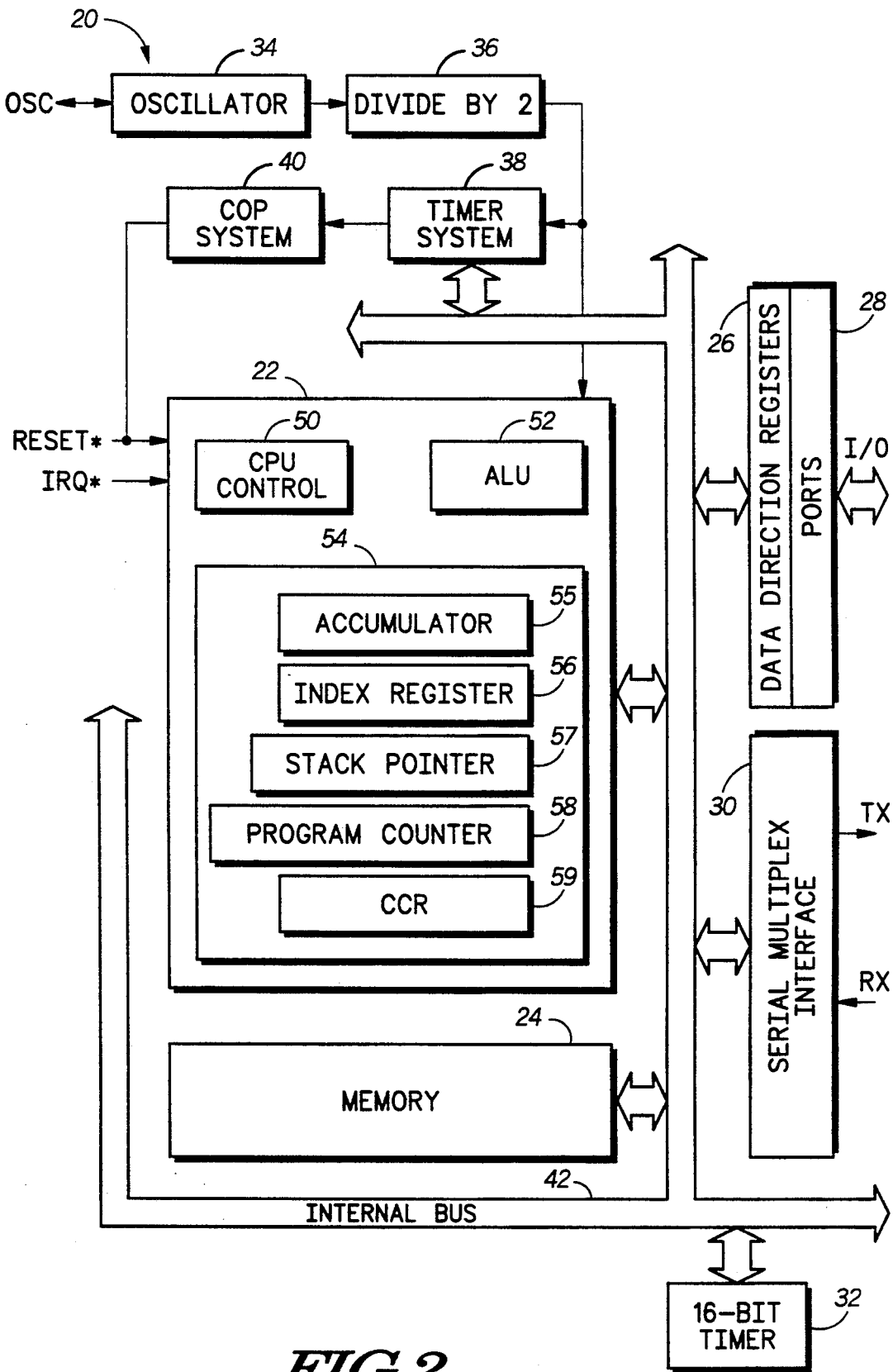
FIG. 2 is a detailed block diagram of a data processing system using an interrupt service system according to an embodiment of the present invention.

Shown in FIG. 2 is a detailed block diagram of a data processing system 20 employing an interrupt service system in accordance with the present invention. In the preferred embodiment, data processing system 20 comprises a core central processing unit (CPU) 22, a memory 24, and data direction registers 26, which are individually coupled to input/output ports 28. In the preferred embodiment, ports 28 are 8-bit bidirectional ports comprising eight I/O lines. The state of any I/O line is software programmable, and all port I/O lines are configured as inputs during power-on reset. Data processing system 20 further comprises a serial multiplex interface (SMI) 30, a 16-bit timer 32, a crystal oscillator 34, divide-by-two logic circuitry 36, a 15-stage timer system 38, a computer operating properly (COP) watchdog system 40, and an internal communications bus 42. The COP system 40 will automatically time-out the data processing system 20, if it is not reset (cleared) within a specific time by the program reset sequence.

In the preferred embodiment, the core CPU 22 comprises CPU control logic 50, an arithmetic logic unit (ALU) 52, and CPU registers 54. CPU registers 54 comprise generally an accumulator 55, an index register 56, a stack pointer 57, a program counter 58, and a condition code register (CCR) 59. CPU registers 54 are connected to each other via internal CPU buses (not shown). Memory 24 is comprised of user ROM, and RAM, and the I/O Ports 28 occupy a predetermined amount of the storage space in memory 24. The operations of CPU 22 are synchronized by an internal processor clock (not shown) provided by logic circuitry 36.

In the illustrated form, data processing system 20 is an intelligent node which operates according to the Class B Data Communications Network Interface Draft SAE (Society of Automotive Engineers) J1850 communications protocol. Data processing system 20 resides on a SAE J1850 serial data communications multiplex (MUX) bus. The MUX bus is a twisted pair wired bus, and the SMI 30 controls the transmission and reception of signals on the MUX bus. During normal operation, data processing system 20 executes a predetermined number of instructions, in a conventional manner. After executing an instruction, the CPU 22 stores the results of the executed instruction in the CCR 59. In the illustrated form, the CCR 59 is a 5-bit register, in which four bits are used to indicate the results of the previously executed instruction, and a fifth interrupt (I) bit indicates whether interrupts are masked (disabled). In the preferred embodiment, there are three ways to interrupt data processing system 20. Interrupts may be generated via an external interrupt pin (IRQ*), by a peripheral (e.g. SMI 30), and using a non-maskable software interrupt instruction (SWI).

When the IRQ* signal is negated for at least one interrupt pulse period, a logic "1" is latched internally by CPU 22 to signify that an external interrupt has been requested. Upon completion of the current instruction (the instruction already fetched, and currently being executed), data processing system 20 tests the interrupt latch (not shown). If the interrupt latch contains a logic "1" and the interrupt mask bit (I bit) in the CCR 59 is clear, then the data processing system 20 responds to the interrupt request. The CPU 22 saves the contents of registers 55–59 on a stack in memory 24, and sets the "I" bit in the CCR 59, thereby preventing the occurrence of additional interrupts. The interrupt request is synchronized internally, and the address for the interrupt service routine is retrieved from a predefined location in memory 24. Upon completion of the interrupt routine, a return from interrupt (RTI) instruction causes the contents of register 55–59 to be recovered from the stack, and the CPU 22 resumes normal processing.

A software interrupt occurs when CPU 22 fetches the SWI instruction. SWI is a non-maskable interrupt which is executed regardless of the state of the "I" bit in the CCR 59. Accordingly, if the "I" bit is zero (signifying that interrupts are enabled), the SWI executes after those interrupts which were pending when CPU 22 fetched the SWI instruction, but before interrupts generated after the SWI instruction was fetched. In the preferred embodiment, the address of the interrupt service routine is specified by the contents stored at a predetermined location in memory 24.

Figure 3:
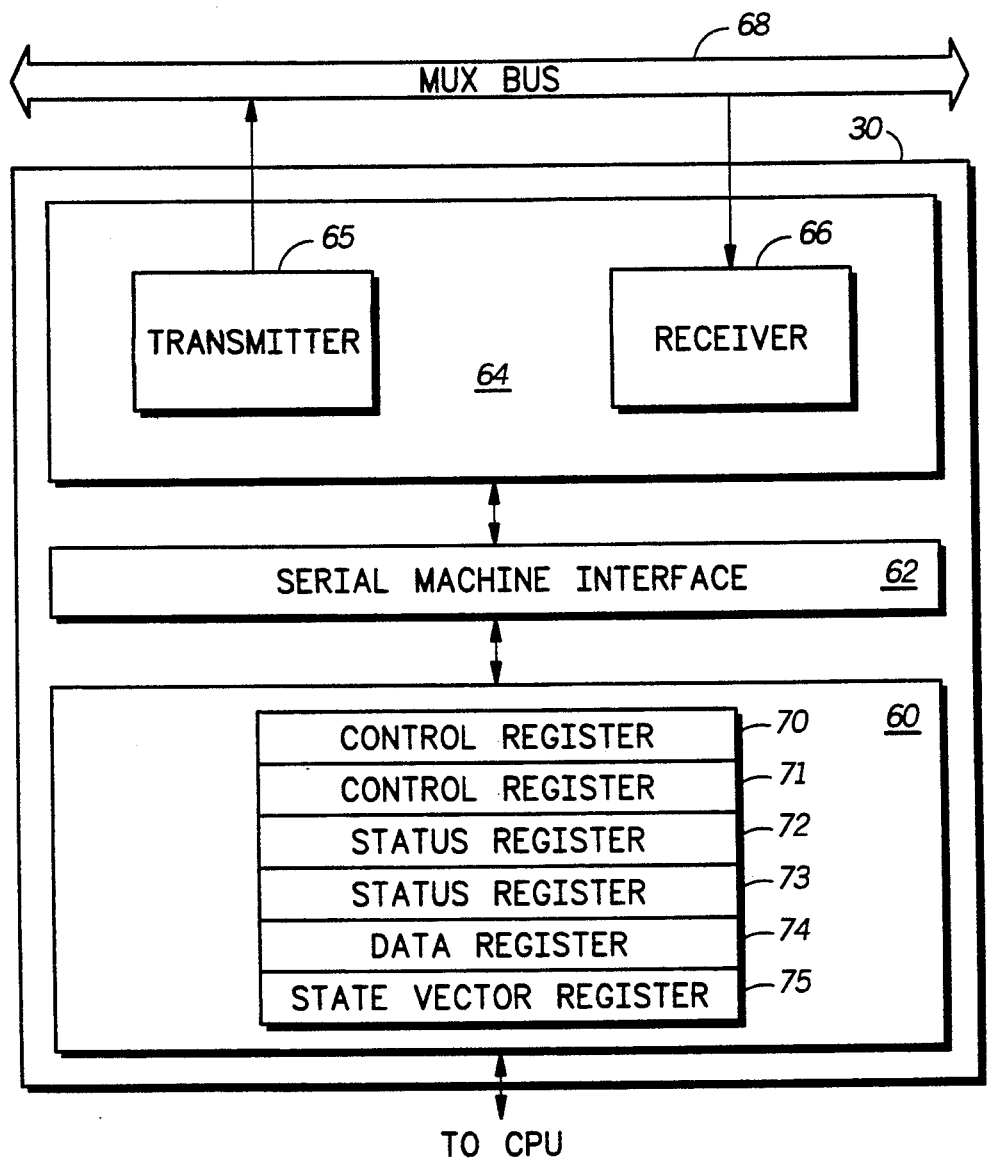
FIG. 3 is a block diagram of a serial multiplex interface (SMI) having a dual purpose state vector register according to the present invention.

On chip peripherals, such as the SMI 30, may also cause interrupts to occur. The SMI 30 is responsible for the encoding and decoding of data bits, and special message delimiter symbols, during transmission and reception of information. Shown in FIG. 3 is a block diagram of the SMI 30 of data processing system 20. The SMI 30 receives and transmits data, via the MUX bus 68. During data transmission and reception, the SMI 30 monitors the activity which occurs on the MUX bus 68. In the preferred embodiment, SMI 30 contains three main logic blocks, namely a CPU interface 60, a serial machine interface 62, and a serial multiplex (MUX) interface 64. The MUX interface 64 provides the connection between the external MUX bus 68, and the serial machine interface 62. The SMI 30 is connected to the MUX bus 68 via transmit and receive lines TX, RX, respectively. The TX and RX lines operate under the control of the serial machine interface 62, which is governed by hardware and software state machines (not shown), in accordance with the J1850 protocol.

The serial machine interface 62 manages the incoming and outgoing serial data. Accordingly the serial machine interface 62 is responsible for framing, bit encoding/decoding, and setting the rate of message transmission and reception. The CPU interface 60 contains software addressable registers 70–75, and provides the link between the CPU 22 and the SMI 30. Registers 70–75 provide control information to the SMI 30, and status information to the CPU 22, while allowing the exchange of data between the CPU 22 and the SMI 30. In the preferred embodiment, registers 70–75 occupy a total of 8 bytes of the memory map, and are discussed below.

CONTROL, STATUS AND DATA REGISTERS

In the preferred embodiment, control registers 70–71 control the operation of the transmitter 65, and receiver 66 of SMI 30. The information stored in the control registers 70–71 govern the format, and sequencing of the transmission and reception of messages. Status registers 72–73 are updated to reflect the activity occurring during the reception and transmission of messages. In the illustrated form, status register 72 is oriented to indicate the condition of the receiver 66 in accordance with the SAE J1850 protocol. Whereas, register 73 indicates the occurrence of more serious conditions and faults during the transmission and reception of messages by the SMI 30. SMI 30 uses a data register 74 to transfer the data transmitted from the CPU 22 to the SMI 30, and to transfer the data received from the SMI 30 to the CPU 22. Data read from register 74 will be the latest (serially received) data. In the illustrated form, the received data will be read from register 74 only after a Receive Data Register (full) interrupt has occurred.

STATE VECTOR REGISTER

In accordance with the present invention, a state vector register (SVR) 75 is provided to substantially decrease the CPU 22 overhead associated with servicing frequent peripheral interrupts. SVR 75 provides an index offset, that is directly related to the current state of the SMI 30. The CPU 22 uses the index offset in conjunction with a user supplied jump table to rapidly enter an interrupt service routine. The use of SVR 75 eliminates the need for the user program to maintain a duplicate state machine (for the SMI 30) in software. When the CPU 22 is in the normal (or wait) mode of operation, changes in the status of the SMI 30 will cause an interrupt request to occur.

Figure 4:
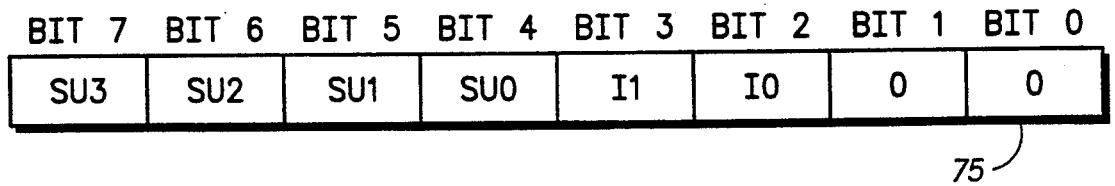
FIG. 4 is a diagram illustrating the bit encodings for the state vector register of the SMI of FIG. 3, in accordance with the present invention.

Shown in FIG. 4 are the bit encodings for the SVR 75. In the present invention, the least significant bits of SVR 75 (bit 0, and bit 1) are always read as zero. Bit 0 and bit 1 are intentionally read as zero to accommodate the smallest incremental byte boundary in the software jump table (Table II). Thus, the number of bits read as zero in SVR 75 may vary according to the incremental byte boundaries in the jump table. The interrupt source bits ($I_0$ and $I_1$) are readable only, and the state number bits ($SU_0$–$SU_3$) are readable and writable. In the illustrated form, the state number bits ($SU_0$–$SU_3$) are provided for the convenience of the programmer, and are not affected by the SMI 30, except during a reset (when they are all set to zero). The programmer may use the bits $SU_0$–$SU_3$ to temporarily store the current state of the software that is servicing the SMI 30. In a preferred embodiment of the present invention, state number bits ($SU_0$–$SU_3$) are updated by a hardware state machine, as opposed to a software state machine. The interrupt source bits ($I_0$, $I_1$) may indicate the source of the interrupt request, in accordance with a predefined interrupt priority scheme. In the illustrated form, the interrupt source bits are updated whenever: (i) the data register 74 contains newly received data; (ii) the received data is read; (iii) the data register 74 requires new transmit data; (iv) the transmit data is written; or (v) any status bit (or bits) within the status registers 70 or 71 change state. When more than one of these events occurs, the interrupt source bits reflect the event with the highest priority. Table I below provides an example of the encoding of the interrupt source bits ($I_0$, $I_1$), together with the respective priority level of each event, in accordance with a predetermined interrupt priority scheme.

TABLE I

| I0 | I1 | INTERRUPT SOURCE | PRIORITY |
|---|---|---|---|
| 0 | 0 | No Interrupts Pending | 0 (lowest) |
| 0 | 1 | Receiver Data Register (full) | 1 |
| 1 | 0 | Transmitter Data Register (empty) | 2 |
| 1 | 1 | Status Register (Bit(s) set) | 3 (highest) |

Thus, the SVR 75 temporarily stores the current state ($SU_0$–$SU_3$) of the software that is servicing the SMI 30. Moreover, the interrupt source bits ($I_0$ and $I_1$) in SVR 75 provide the source of the highest priority interrupt request that is currently pending. Upon receiving an interrupt, the CPU 22 will determine which peripheral generated the interrupt request. In the case where the interrupt was generated by SMI 30, the software reads the value within the SVR 75, while simultaneously loading the value into the CPU's index register 56. The CPU 22 uses the value stored in the index register 56 as an index into a "jump table", stored in memory 24, which directs the CPU 22 to the appropriate routine for servicing the specific interrupt request generated by the peripheral. Shown in Table II below is an example of a software jump table, located in memory 24, for use with the present invention.

TABLE II

|  | ACTION | COMMENTS |
|---|---|---|
| SERVICE | LDX SMSVR | Fetch State Vector Number |
|  | JMP JMPTAB,X | Enter service routine, |
| JMPTAB | JMP SERVE0 | Service condition #0 |
|  | NOP |  |
|  | JMP SERVE1 | Service condition #1 |
|  | NOP |  |
|  | JMP SERVE2 | Service condition #2 |
|  | NOP |  |
|  | . . . |  |
|  | JMP SERVE63 | Service condition #63 |

In the above example, the no operation (NOP) instructions are used to align the jumps (JMP) on 4-byte boundaries, in accordance with the incremental byte boundary specified by bit 0 and bit 1 of SVR 75.

In the illustrated form, the clearing of a high priority interrupt may leave a lower priority interrupt pending, and bits $I_0$ and $I_1$ of the SVR 75 will reflect the source of the remaining pending interrupt request. During the execution of the appropriate interrupt service routine, the software state machine may update the state information bits ($SU_0$–$SU_3$) of SVR 75 to reflect a change in state of the peripheral. After servicing the requested interrupt, the peripheral (e.g. SMI 30) will update the interrupt source bits $I_0$ and $I_1$, to provide the source of the next interrupt to be serviced, if any. Thus, the change of the state information bits ($SU_0$–$SU_3$) and the updating of the interrupt source bits ($I_0$, and $I_1$) will provide a new index value into the jump table.

Figure 5:
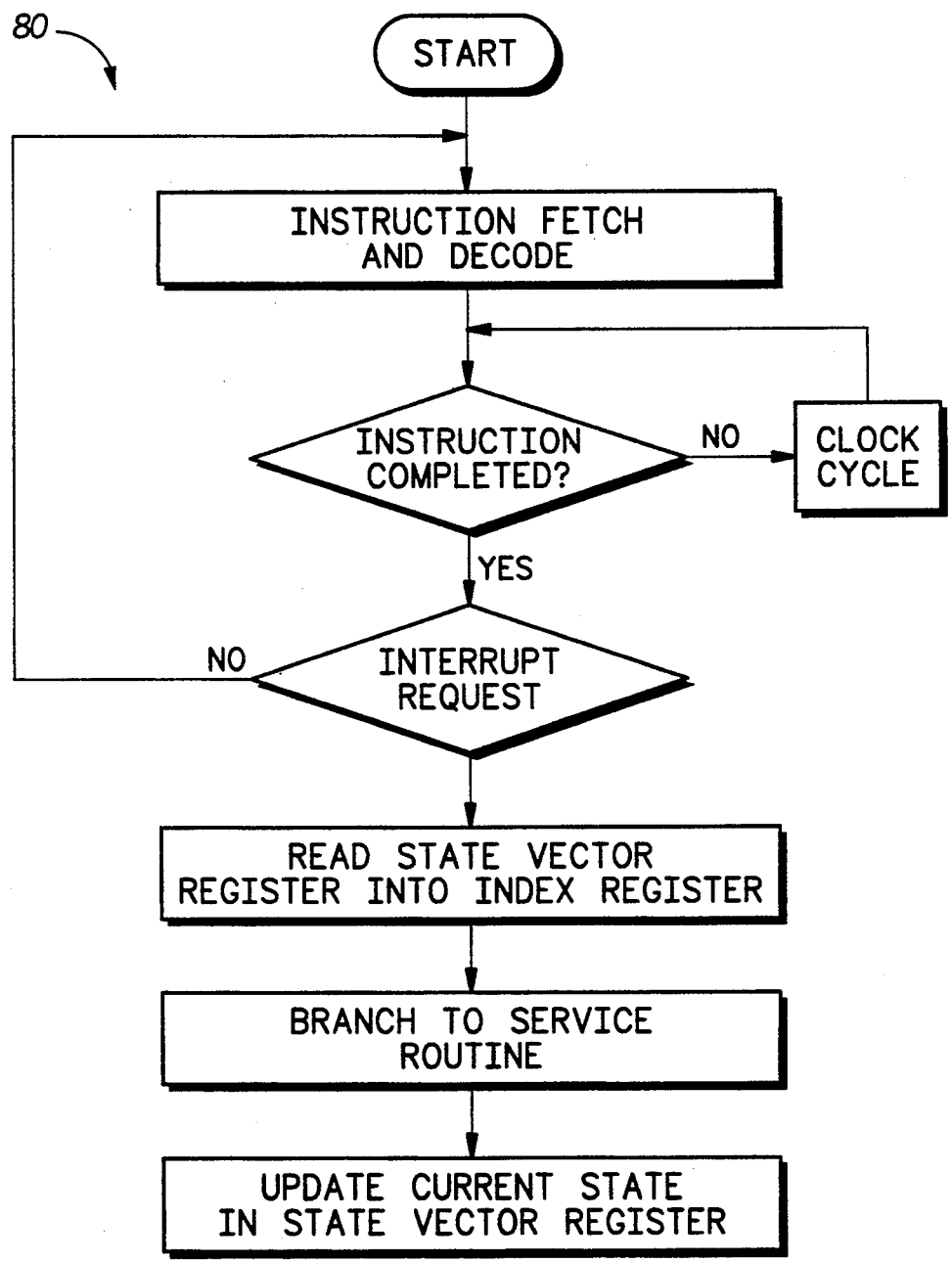
FIG. 5 is a functional flow diagram for processing interrupts, in accordance with the present invention.

Shown in FIG. 5 is a functional flow diagram 80 illustrating a technique for processing interrupts, in accordance with the present invention. As indicated, the CPU 22 executes instruction in a normal mode of operation, until it detects an interrupt request. Upon detecting the occurrence of an interrupt request, the CPU 22 reads the value stored in the SVR 75 into index register 56. As previously described, the CPU 22 uses the value stored in the index register 56 to branch to the appropriate interrupt service routine, via a jump table. Meanwhile, the SMI 30 updates the current state information stored in the SVR 75 with the next state information. Thus, the need to write the state information into memory 24 is eliminated, and therefore, the processor overhead associated with duplicating the peripheral state machine in RAM is avoided. Accordingly, the present invention significantly reduces the burden, on the overall system performance, associated with servicing interrupts.

While the present invention has been described in a preferred embodiment, it will be apparent to those skilled in the art that the disclosed invention may be modified in numerous ways and may assume many embodiments other than that specifically set out and described above. For example, the SVR 75 may be used in conjunction with any peripheral (e.g. timer). Furthermore, the size of the jump table may be modified, based upon the number of peripheral states. Alternatively, the jump table may be eliminated entirely if a different software approach is utilized. The peripheral (e.g. SMI 30) may include a protocol hardware state machine, which automatically updates the SVR 75 with the current state identifier ($SU_0$–$SU_3$) information. The size of the SVR 75 may change (e.g. 16-bits) according to the peripheral and the CPU, and the size of the bits fields may vary to accommodate the variable peripheral state or interrupt source information. Moreover, MUX bus 68 can be any type of transmission medium (e.g. fiber optic, single wire). Accordingly, it is intended by the appended claims to cover all modifications of the invention which fall within the true spirit and scope of the invention.

We claim:

1. In a data processing system having a processor for executing a sequence of instructions provided by a memory in response to a sequence of instruction addresses, and having a selected number of peripheral devices coupled to said processor via an internal communications bus a method for servicing an interrupt request from one of the selected number of peripheral devices, comprising the steps of:

storing an index value in an addressable register in an interrupting peripheral device, in response to said interrupting peripheral device generating an interrupt request, said index value comprising at least a first bit field representing a current state identifier for identifying a state of a state machine which controls said interrupting peripheral device, and a second bit field representing an incremental byte boundary identifier, said incremental byte boundary identifier being determined by entry alignment in a table in said memory of each of a plurality of interrupt service routines;

providing said index value to said processor, via said internal communications bus, said processor using said index value to access a corresponding interrupt service routine, stored in said table in said memory, for responding to said interrupt request;

updating, during execution by said processor of said interrupt service routine, said current state identifier stored in said addressable register with a next state identifier, by modifying said first bit field of said index value, in response to said state machine changing states as result of an occurrence in said interrupting peripheral device of a predefined event, said next state identifier and said incremental byte boundary identifier forming a new index value in said addressable register; and executing said interrupt service routine to clear said interrupt service request.

2. The method for servicing an interrupt request according to claim 1 further comprising the step of providing said new index value to said processor, via said internal communications bus, said new index value being used by said processor to access a new interrupt service routine, in said table in said memory, for a new interrupt request.

3. In a data processing system comprising:

a processor;

an internal communications bus coupled to said processor;

a memory coupled to said internal communications bus, said memory storing a plurality of table entries for a plurality of interrupt service routines;

a predetermined number of peripheral devices coupled to said processor, via said internal communications bus, a selected peripheral device having a plurality of addressable registers for storing control information, for providing status information, and for allowing the exchange of a plurality of data bytes to and from said processor;

a method for servicing an interrupt request received by said processor for an interrupting peripheral, comprising the steps of:

storing a current state identifier, for a state machine which controls said interrupting peripheral device, in a first bit field in a first addressable register in said interrupting peripheral device;

storing an interrupt priority identifier in a second bit field in said first addressable register, said interrupt priority identifier signifying a source in said interrupting peripheral device of said interrupt service request, according to an interrupt priority scheme;

storing a value in a third bit field of said first addressable register, said value being based upon an incremental byte boundary determined by alignment in said memory of each of said plurality of table entries for said plurality of interrupt service routines;

updating, during execution by said processor of said interrupt service routine, said current state identifier stored in said first addressable register with a next state identifier, in response to said state machine changing states, said next state identifier, said interrupt priority field, and said third bit field forming an index offset value in said first addressable register; and providing said index offset value to said processor, said index offset value being used by said processor as an index into said plurality of table entries in said memory, said processor executing a corresponding one of said plurality of interrupt service routines to clear said interrupt service routine.

4. The method of servicing an interrupt request according to claim 3 further comprising the step of simultaneously updating said second bit field with a next priority interrupt identifier to form a new index offset value in said first addressable register, said new offset value being provided to said processor, and said processor using said new index offset value as a new index into said plurality of table entries in said memory.

5. The method for servicing an interrupt request according to claim 4 wherein said step of simultaneously updating said second bit field with said next priority interrupt identifier is repeated in said data processing system until a value stored in said second bit field indicates that no further interrupt request are pending.

6. In a data processing system having a processor for executing a sequence of instructions provided by a memory in response to a corresponding sequence of instruction addresses, and having a selected number of peripheral devices coupled to said processor, via an internal communications bus, a method for servicing an interrupt request from an interrupting peripheral device comprising the steps of:

storing a current state identifier in a first bit field in a software addressable register in said interrupting peripheral device, said current state identifier signifying a current state of said interrupting peripheral device;

storing an interrupt priority identifier in a second bit field in said software addressable register, said interrupt priority identifier signifying a source in said interrupting peripheral device of said interrupt service request, according to a predetermined interrupt priority scheme;

updating, during execution by said processor of said interrupt service routine, said current state identifier stored in said software addressable register with a next state identifier, in response to said interrupting peripheral changing states, said next state identifier and said interrupt priority identifier forming an index offset value in said software addressable register;

providing said index offset value to said processor, via said internal communications bus, said index offset value being used, by said processor as an index into a jump table in said memory, to retrieve a corresponding interrupt service routine; and executing said interrupt service routine to clear said interrupt service request.

7. The method of servicing an interrupt request according to claim 6 further comprising the step of updating said second bit field with a lower priority interrupt identifier to provide a new index offset value to said processor, said new index offset value being used by said processor to retrieve a new interrupt service routine from said memory.

8. The method of servicing an interrupt request according to claim 7 wherein said step of updating said second bit field with said lower priority interrupt identifier is repeated in said data processing system until a value, stored in said second bit field, indicates that no further interrupt requests are pending.

* * * * *